United States Patent [19]
Pringle

[11] 3,812,935

[45] May 28, 1974

[54] DISC BRAKE WEAR TAKE UP DEVICE

[75] Inventor: William L. Pringle, Grosse Pointe Shores, Mich.

[73] Assignee: United States Steel Corporation, Pittsburgh, Pa.

[22] Filed: Jan. 15, 1973

[21] Appl. No.: 323,569

[52] U.S. Cl............ 188/71.8, 188/196 P, 188/347
[51] Int. Cl............................................. F16d 65/54
[58] Field of Search............ 188/71.8, 71.9, 79.5 P, 188/79.5 GE, 196 P, 347

[56] References Cited
UNITED STATES PATENTS

| | | | |
|---|---|---|---|
| 1,865,105 | 6/1932 | Houplain | 188/347 X |
| 3,371,750 | 3/1968 | Schutte et al. | 188/71.8 |
| 3,371,753 | 3/1968 | Meier | 188/196 P X |

Primary Examiner—Duane A. Reger
Attorney, Agent, or Firm—McGlynn and Milton

[57] ABSTRACT

A wear take-up device for a disc brake assembly comprising: friction means for frictionally engaging a rotor, and movable actuator means; the actuator means including first means for engaging the friction means when the actuator means moves in a first direction and second means for disengaging the first means from the friction means when the actuator means moves in a second direction wherein movement in the first direction is toward frictional engagement. The first means comprises wedge means including ramp members and a circumferentially expandable ring member, the ring member being adapted to ride on said ramp members. The second means comprises disabler means having a plurality of arm members for engaging the ring member and proving the same out of engagement with the friction means.

18 Claims, 3 Drawing Figures

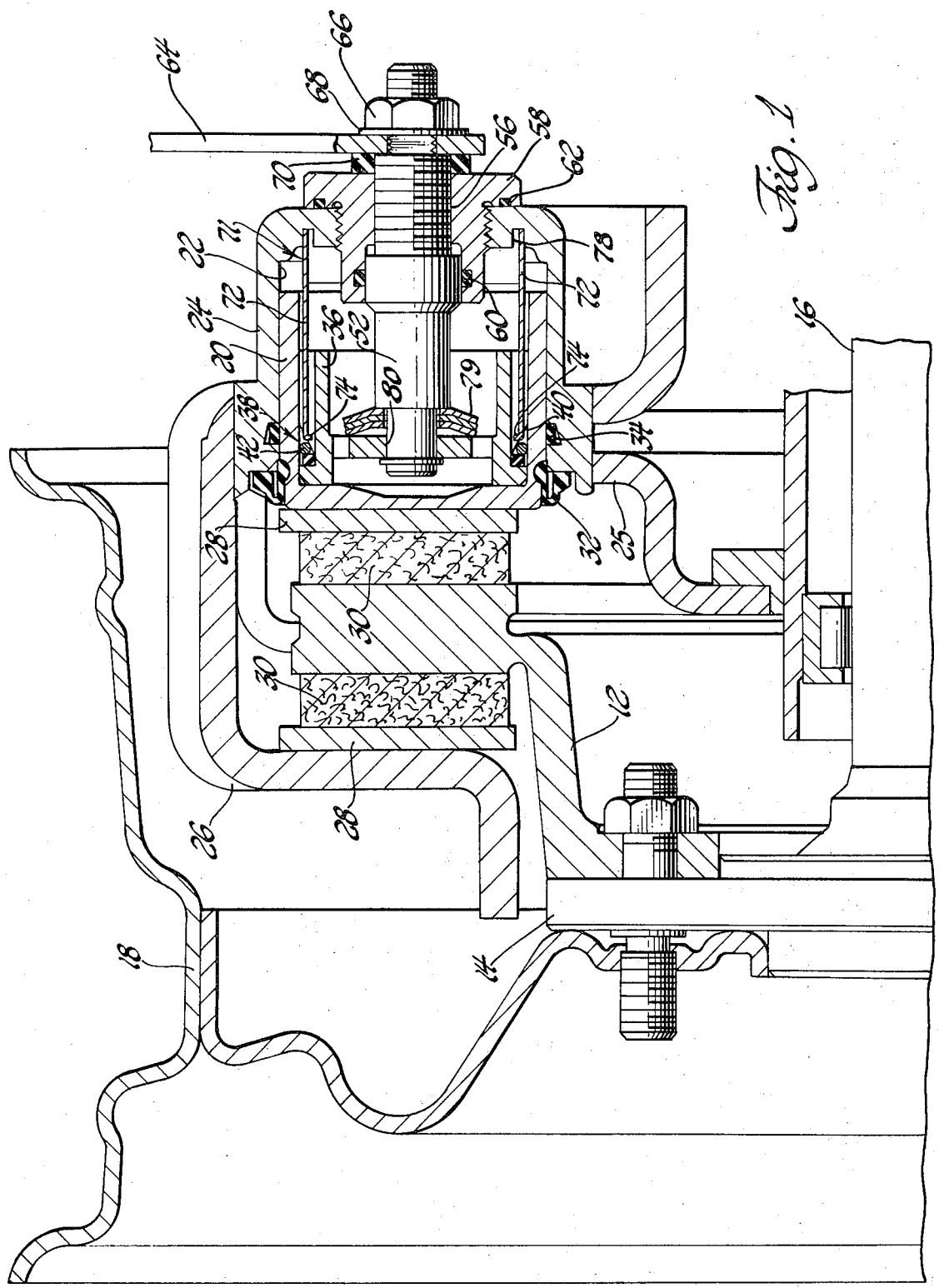

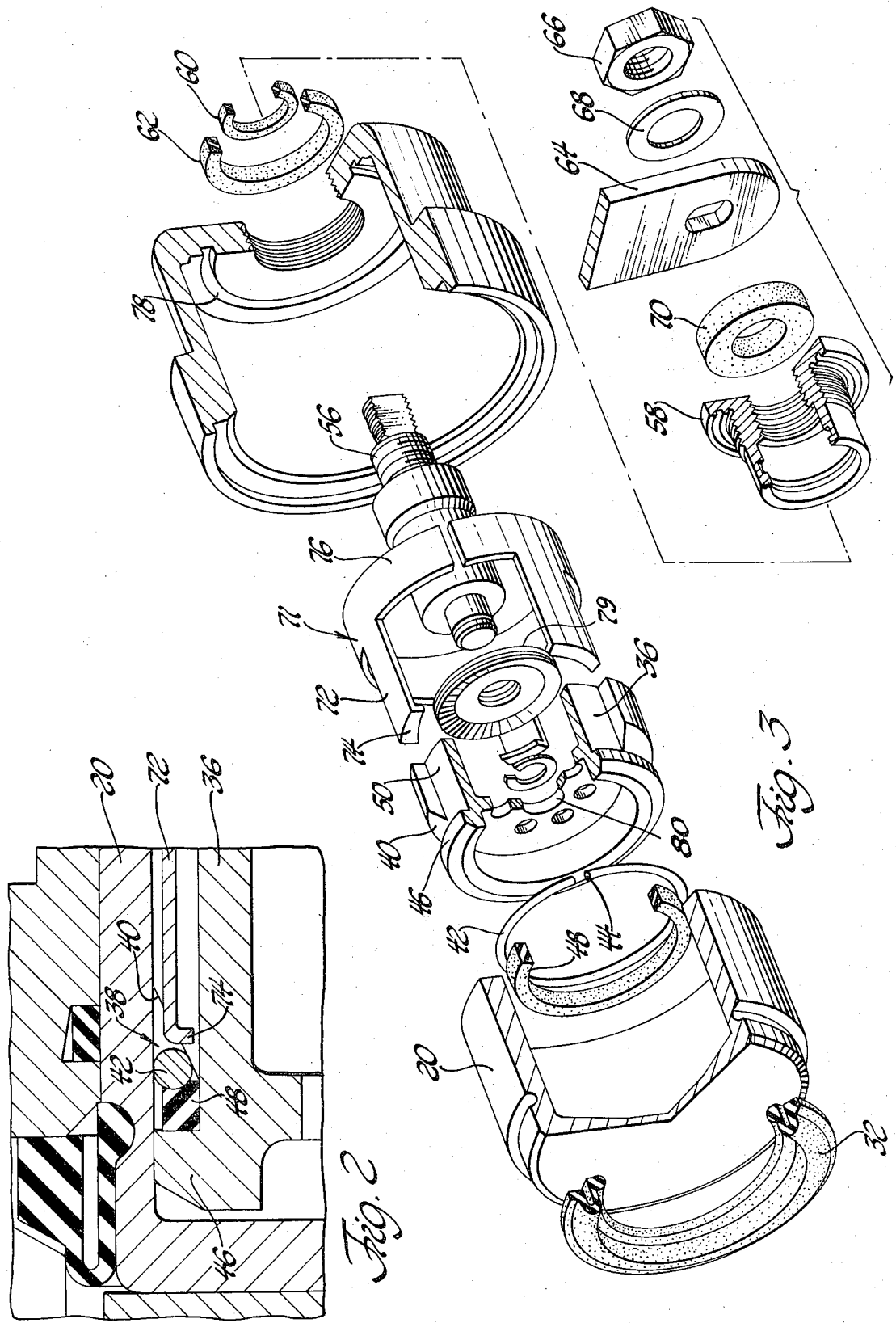

DISC BRAKE WEAR TAKE UP DEVICE

This invention relates generally to disc brake systems for automobiles and the like. More specifically, this invention relates to a wear take-up device which automatically compensates for the change in the dimension due to wear of various friction members of the brake discs.

Most conventional disc brake systems are adapted to be selectively actuated hydraulically or mechanically. The hydraulic actuation is normally accomplished by depressing a brake pedal and the mechanical actuation usually is provided in conjunction with an emergency or parking brake feature. The problems which arise due to wear usually affect the mechanical actuation mechanism due to the nature of the interaction between the parts. In other words, as various parts wear, their positions in relation to the other parts of the assembly change. The range of movement of the mechanical mechanism is limited; therefore, as wear continues, the mechanical mechanism becomes less effective and finally becomes inoperative.

This problem is confronted in the patent to Schutte et al. U.S. Pat. No. 3,374,750. The Schutte patent teaches a plunger for moving a brake piston against a friction disc, a portion of which is provided with a truncated conical surface. As the plunger moves forwardly to apply a parking brake force, a plurality of balls held captive in a cage-like device ride up the conical surface and wedge against the interior of the brake piston, forcing it to move with the plunger. The problem which arises, however, is that the balls will remain wedged between the two parts when the parking brake force is released, thus keeping the brake piston in engagement with the friction disc. This problem is compounded by the cage arrangement, which includes a spring which urges the balls toward wedging engagement.

It is, therefore, an object and feature of the instant invention to provide a disc brake assembly including a rotor, friction means for frictionally engaging the rotor, and movable actuator means; the actuator means including first means for engaging and moving the friction means in a first direction into a frictional engagement with the rotor, and second means, for disengaging the first means from the friction means when the actuator means moves in a second direction.

In accordance with the foregoing object and feature, another object and feature of the instant invention includes providing a disc brake assembly wherein the first means comprises wedge means including a circumferentially expandable ring member for coacting with ramp members, and a second means comprises disabler means for disengaging the wedge means.

Other objects and features of the instant invention will be readily appreciated as the same becomes better understood by reference to the following detailed description when considered in connection with the accompanying drawings wherein:

FIG. 1 is a cross-sectional elevational view of a preferred embodiment constructed in accordance with the instant invention;

FIG. 2 is an enlarged sectional view of a portion of FIG. 1 after wear; and

FIG. 3 is an exploded view, partially cut away, of the instant invention shown in FIG. 1.

Referring to the drawings, a brake assembly is generally shown at 10. The disc brake assembly 10 includes a brake disc or rotor 12 which is attached for rotation with the wheel hub 14 on the axle 16 of an automobile. A conventional wheel 18 is shown mounted on the wheel hub 14 in the normal fashion.

The disc brake assembly 10 includes friction means for frictionally engaging the rotor 12. The friction means includes a brake piston 20, which is disposed for sliding movement within the bore 22 of a housing 24, and a floating caliper member 26 which is secured to the housing 24. The housing 24 is slidably mounted on a mount 25 which is secured to the axle 16 of the automobile. The friction means further include friction pads 30 and backing plates 28 for facilitating frictional engagement at the rotor 12.

A boot seal 33 is disposed between the brake piston 20 and the housing 24 to provide a pressurized fluid seal therebetween and to facilitate movement of the piston 20 with respect to the housing 24. A ring seal 34 is also included 20 which provides a fluid seal between the brake piston member 20 and the housing 24. A brake line (not shown) is attached to the rear of the housing 24 in communication with the bore 22. The bore 22 of the housing 24 is entirely sealed, such that when fluid pressure is introduced into the bore 22 thorugh the brake line, the brake piston 20 moves to the left, as shown in FIG. 1, until it engages the rotor 12. Engagement of the brake piston 20 with the rotor 12 causes a reaction force which moves the housing 24 and thus the caliper member 26 to the right, thereby causing both sides of the rotor 12 to be frictionally engaged. The frictional engagement produced by the clamping force on the rotor 12 causes the rotational speed of the wheel hub 14 and the wheel 18 to be reduced.

The description heretofore sets forth a more or less common disc brake system of the floating caliper type which is hydraulically actuated during normal driving to apply a braking force to a rotational disc or rotor. The wear take up device, which is the subject of the instant invention, provides means for ensuring positive response of the disc brake assembly as wear occurs. The wear take-up device which is the subject matter of the instant invention generally includes actuator means comprising a substantially cylindrical actuator member 36, which is disposed for limited movement within the brake piston 20. The actuator member 36 includes first means comprising wedge means generally indicated at 38 for engaging the brake piston 20 when the actuator member 36 moves in a first direction. The first direction is to the left as viewed in FIG. 1, and the wedge means 38 engages the brake piston 20 to move the same with the actuator member 36 into frictional engagement with the rotor 12.

The wedge means 38 includes ramp members 40 and a circumferentially expandable ring member 42. The ring member 42 is adapted to ride on the ramp members 40 and is expandable due to the split 44 along its circumference. The actuator member 36 includes an outwardly extending flange 46 at its forward end and a resilient spacer member 48 for maintaining the ring member 42 in coacting engagement with the ramp members 40.

In the preferred embodiment of the instant invention, the actuator member 36 is provided with three ramp members 40 which are disposed about the circumference of the actuator member 36. The ramp members 40 are spaced apart to provide valleys or grooves 50 between each of the ramp members 40, the purpose of which will be hereinafter described.

The actuator means includes a threadedly movable shaft 52 for moving the actuator member 36 longitudinally within the housing member 24. The shaft 52 includes threads 56 at its outer end which enable it to be threadedly mounted in a bushing 58 disposed in the rear wall of the housing 24. The bushing 58 includes a first ring seal 60 for sealing engagement with the shaft 52 and a second ring seal 62 for sealing engagement with the housing 24. The shaft 52 is adapted for threaded longitudinal movement through the bore 22 in the housing 24. A lever 64 is secured to the end of the shaft 52 by a nut 66, washer 68, and ring 70, to facilitate rotation of the shaft 52. The lever 64 is connected to a remote control assembly (not shown) of any well-known design which is operated by a parking brake pedal or the like.

Movement of the actuator member 36 to the left by rotation of the shaft 52 causes the brake piston 20 to engage the rotor 12. Initially, the forward wall of the actuator member 36 abuts the brake piston 20 and the brake piston 20 is moved immediately upon movement of the actuator member 36. However, after the friction elements 30 begin to wear due to use, the brake piston 20 is moved to the left, as shown in FIG. 2. Ordinarily, therefore, it will be necessary for the actuator member 36 to move a greater distance before it comes into abutting engagement with the brake piston member 20 to move the same. Because of the limited angular movement of the lever 64, the actuator member 36 will soon be unable to reach the brake piston 20, and the parking brake will be ineffective. The wedge means 38, however, prevents this undesirable result. As the actuator member 36 moves to the left, the ring member 42 rides up the ramp members 40 and engages the inner wall of the brake piston 20. The disposition of the ring member on the ramp members 40 is such that very slight movement of the actuator member 36 causes the ring member 42 to engage the inner wall of the brake piston 20, thereby causing the brake piston 20 to move with the actuator member 36. In other words, it is no longer necessary that the forward wall of the actuator member 36 be in abutting engagement with the brake piston 20 to move the brake piston 20 into frictional engagement with the rotor 12, because the wedging action between the actuator member 36 and the brake piston 20 provides substantially simultaneous movement therebetween.

The actuator means also includes second means comprising disabler means for disengaging the wedge means from the brake piston 20 wherein the actuator member 36 is moved away from the rotor 12. The disabler means therefore provides positive release of the braking force. The disabler means includes a spider member generally indicated at 71 which includes a plurality of arm members 72. Each of the arm members includes an inwardly extending finger member 74 for engaging the ring member 42. The spider member 70 also includes a collar member 76 for interconnecting the arm members 72. The collar member 76 is adapted to be located in a locating groove 78, which is disposed in the rear wall of the housing member 24.

In the preferred embodiment of the instant invention, the disabler means comprising the spider member 71 includes three arm members 72 which are disposed in the grooves 50 in the actuator member 36. Upon a slight incremental movement to the right by the actuator member 36 and the brake piston 20, which are wedged together, the fingers 74 of the arm member 72 force the ring member 42 down the ramp members 40, thereby eliminating the wedging engagement. The actuator member 36 is thereby free to move independently of the brake piston 20 in a direction to the right as viewed in FIG. 1.

The disc brake assembly 10 is also provided with a mechanical energy storage device, or parking brake feature, which comprises the subject matter of a copending patent application Ser. No. 323,481 of the inventor of the instant invention.

Generally, the energy storage device includes a plurality of Belleville type springs 79 which are disposed on the threaded shaft 52 such that when the brake piston 20 is moved into frictional engagement with rotor 12, the shaft 52 continues to move through a bore 80 in the actuator member 36 until the Belleville type springs 79 flatten out. Since the frictional engagement of the various parts during normal driving has caused the parts to heat up and expand, they will cool and contract after the parking brake is applied. Eventually, the braking force will be lost; however, the Belleville springs 79 store energy which maintains the brake piston 20 in frictional engagement with the rotor 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive or privilege is claimed are defined as follows:

1. A disc brake assembly comprising: friction means for frictionally engaging a rotor, and movable actuator means; said actuator means including wedge means for engaging said friction means when said actuator means moves in a first direction and disabler means having at least one stationary arm member in operative proximity to said wedge means for disengaging said wedge means from said friction means when said actuator means moves in a second direction wherein movement in said second direction is toward frictional engagement.

2. An assembly as set forth in claim 1 wherein said wedge means includes ramp members and a circumferentially expandable ring member, said ring member being adapted to ride on said ramp members.

3. An assembly as set forth in claim 2 wherein said actuator means includes a substantially cylindrical actuator member.

4. An assembly as set forth in claim 3 wherein said ramp members are disposed about the circumference of said actuator member.

5. An assembly as set forth in claim 4 wherein said wedge means includes a spacer member for positioning said ring member on said ramp members.

6. An assembly as set forth in claim 5 wherein said actuator member includes an outwardly extending flange for maintaining said spacer member and ring member thereon.

7. An assembly as set forth in claim 6 wherein said disabler means includes a spider member having a plurality of arm members.

8. An assembly as set forth in claim 7 wherein each of said arm members includes an inwardly extending finger member for engaging said ring member.

9. An assembly as set forth in claim 8 wherein said spider member includes a collar member for interconnecting said arm members.

10. An assembly as set forth in claim 9 wherein said actuator member includes three ramp members interposed by grooves and said disabler means includes three arm members disposed in said grooves.

11. An assembly as set forth in claim 10 wherein said friction means includes a housing member slidably mounted on a support body and a brake piston member movably supported within said housing member.

12. An assembly as set forth in claim 11 wherein said actuator member is slidably disposed within said brake piston member.

13. An assembly as set forth in claim 12 wherein said housing member includes a locating groove adapted to receive and locate said collar member of said disabler means.

14. An assembly as set forth in claim 13 wherein said actuator means includes a threadably movable shaft member for moving said actuator longitudinally within said housing member.

15. An assembly as set forth in claim 14 wherein said friction means includes a floating caliper member secured to said housing member for movement therewith.

16. An assembly as set forth in claim 1 wherein said disabler means includes a spider member having a plurality of arm members.

17. An assembly as set forth in claim 16 wherein each of said arm members includes an inwardly extending finger member.

18. An assembly as set forth in claim 16 wherein said spider member includes a collar member for interconnecting said members.

* * * * *